United States Patent
Kotowich

(10) Patent No.: US 9,736,148 B2
(45) Date of Patent: Aug. 15, 2017

(54) SECURE ACCESS BY A USER TO A RESOURCE

(71) Applicant: Passrules US Security LLP, Scottsdale, AZ (US)

(72) Inventor: Ken Kotowich, Winnipeg (CA)

(73) Assignee: Passrules US Security LLP, Scotsdale, AZ (US)

( * ) Notice: Subject to any disclaimer, the term of this patent is extended or adjusted under 35 U.S.C. 154(b) by 0 days.

(21) Appl. No.: 14/820,662

(22) Filed: Aug. 7, 2015

(65) Prior Publication Data

US 2017/0041318 A1    Feb. 9, 2017

(51) Int. Cl.
*G06F 21/36* (2013.01)
*H04L 29/06* (2006.01)

(52) U.S. Cl.
CPC ............ *H04L 63/083* (2013.01); *G06F 21/36* (2013.01)

(58) Field of Classification Search
None
See application file for complete search history.

(56) References Cited

U.S. PATENT DOCUMENTS

| | | | | |
|---|---|---|---|---|
| 8,140,854 B2* | 3/2012 | Ogawa | ..................... | G06F 21/31 713/182 |
| 2006/0015725 A1* | 1/2006 | Voice | .................. | H04L 63/0245 713/168 |
| 2006/0047969 A1* | 3/2006 | Goertzen | .............. | G06F 21/335 713/185 |
| 2006/0156385 A1* | 7/2006 | Chiviendacz | ........... | G06F 21/36 726/2 |
| 2010/0031330 A1* | 2/2010 | Von Ahn | ................. | G06F 21/36 726/5 |
| 2011/0191592 A1* | 8/2011 | Goertzen | ................ | G06F 21/36 713/182 |
| 2012/0311342 A1* | 12/2012 | Nuzzi | ..................... | G06F 21/31 713/182 |
| 2014/0033273 A1* | 1/2014 | Rathbun | ............ | G06Q 20/3276 726/3 |
| 2014/0047524 A1* | 2/2014 | Auger | ...................... | G06K 5/00 726/7 |
| 2014/0115670 A1* | 4/2014 | Barton | .................. | H04L 9/3228 726/4 |
| 2014/0282959 A1* | 9/2014 | Mechaley, Jr. | ......... | G06F 21/36 726/7 |
| 2014/0282979 A1* | 9/2014 | Andon | ................ | H04L 63/0884 726/7 |
| 2014/0310514 A1* | 10/2014 | Favero | .................. | H04L 9/0869 713/153 |

(Continued)

*Primary Examiner* — Malcolm Cribbs
(74) *Attorney, Agent, or Firm* — Adrian D. Battison; Ade & Company Inc.

(57) ABSTRACT

In a method of approving access to a server network from any terminal requesting access, a communication request is sent from the terminal to a server on a first communication path. An image containing a series of symbols is communicated to the user on a communication path different from the first path. From the image the user calculates a response based upon a particular pattern in the image defining certain symbols which are then used in an operation to determine from the symbols a response which is different from the symbols. A comparison is made between the response received and a previously stored response to assess whether access should be allowed.

12 Claims, 5 Drawing Sheets

(56) References Cited

U.S. PATENT DOCUMENTS

2015/0047016 A1* 2/2015 Wilhelm ................ G06F 3/017
    726/18
2016/0127134 A1* 5/2016 Goldstone ............... G06F 21/36
    726/7
2016/0371475 A1* 12/2016 Zhao ....................... G06F 21/31

* cited by examiner

SECURE ACCESS BY A USER TO A RESOURCE

The present invention relates generally to user interfaces, and more specifically, to a method and system for securing access to a resource such as a web resource or server system.

BACKGROUND OF THE INVENTION

Web resources a server system having access to a network increasingly provide access to interfaces that must be protected from unauthorized use. Typical security on such user interfaces is provided by a password or "personal identification number (PIN) that must be provided to the user interface via an input device prior to further access by an individual (or in some instances another machine) accessing the interface.

The level of security provided by a "weak" password or token such as a password or PIN is generally related to its length and arbitrariness. However, the same factor is also determinative of the difficulty for a human to remember the password. Also, the number of possible password element values, e.g., just digits versus digits plus letters is generally made larger to improve security, but the input set size increase is generally either thwarted by use of common words or numbers within the total possible space of values.

Two-dimensional textual or graphical hint systems have been proposed, from systems that actually display the password in a form such as a "hidden word" puzzle to systems that use a randomized arrangement of icons that must be selected in order or a particular arrangement of icons that must be selected in a pattern in order to satisfy password entry. All of the above systems have an advantage in that they are not easily overcome by mere repetitive machine input.

However, all of the above systems may reveal their underlying password eventually through human observation, especially when the underlying password hiding mechanism is known. For example, if it is known that the password hiding mechanism is a particular arrangement of icons that must be selected in a pattern, an observer can ignore the actual icons and merely note the pattern.

Therefore, it would be desirable to provide a method and system for hiding passwords in a display that cannot be easily discovered through observation of entry patterns and values and which is communicated to the user in a secure manner.

SUMMARY OF THE INVENTION

According to the invention there is provided a method for approving access from a user location having a computer terminal of a user to a computer network or web resource on a server system comprising:

initiating an access request for an access session by the computer terminal of the user location on a communications link between the server system and the computer terminal;

in response to the access request, sending to the user location a clue table image containing on the image a pattern of characters, the image for the access session being different from image generated for previous sessions;

displaying said image including the pattern of characters to said user;

to commence a session, causing said user to compute from the image a response;

causing said user to enter the response into the computer terminal for communication to the server system;

comparing said response received with an expected response computed from said image;

and selectively providing access by the user to said server system on said communication link for said session in conformity with a matching result of said comparing;

and sending an access approval/denial for the server system or web resource to the computer terminal;

wherein the image is communicated to the user location by a different communications link than is the computed response;

and wherein the response is computed by firstly selecting a selected set of the characters in the image by determining the location in the image of the characters based on a predetermined pattern of the characters in the image and secondly by carrying out an operation on the selected set.

In one arrangement, the image is communicated to the user location from a server separate from said server system so that the communication of the image is effected on a communications link different from the communication link between the terminal and said servers system.

Preferably the image is communicated by the separate server on receipt of a request from the server system.

Preferably the separate server is cloud based but can be located at any suitable location where the communication path is different from that to the server to be accessed.

In another arrangement, the communication is effected wholly by the server to be accessed but the image is communicated to the user location from the server system to a separate device such as a mobile device at the user location separate from or different from the computer terminal so that the communication route is different path. Thus while both the communications between the terminal and the server and between the server and the mobile device are through the Internet using https protocols, they are defined by two separate Internet paths. Also as an alternative the server communicating to the mobile device or other device at the user location may also be a separate server system.

In all these cases the image is not stored at the computer terminal is only stored at the server at a secure location. Thus there is no access to the stored images or to the responses at the terminal or at any other location other than the secure access server.

Preferably the server system comprises a device operating system or web resource.

Preferably where the server system to be accessed is a network, the device operating system allows the user to go anywhere in the internal network provided by the server system.

Preferably the user is required to download an app that is specific to their type of computer terminal in order to use the system.

In some cases the computer terminal comprises a mobile device.

Preferably the communications between the computer terminal and the server system utilize https:/ internet protocol.

Typically the characters in the image are numerical values. However many different types of characters can be used in the image including alphanumeric symbols and other simply graphic symbols.

In addition to the selection of the symbols by recognition is necessary for the user to carry out an operation on the symbols selected. In one example, the operation is carried out by an arithmetic operation on a numerical value forming at least one of the characters or symbols.

Preferably during computing of the response said user performs at least one operation on said character of said at least one of said elements of said predetermined selected set such that the response comprises at least one hidden character which is not identical to any one of said characters upon which the operation is performed.

BRIEF DESCRIPTION OF THE DRAWINGS

One embodiment of the invention will now be described in conjunction with the accompanying drawings in which.

DETAILED DESCRIPTION

Figure 1:
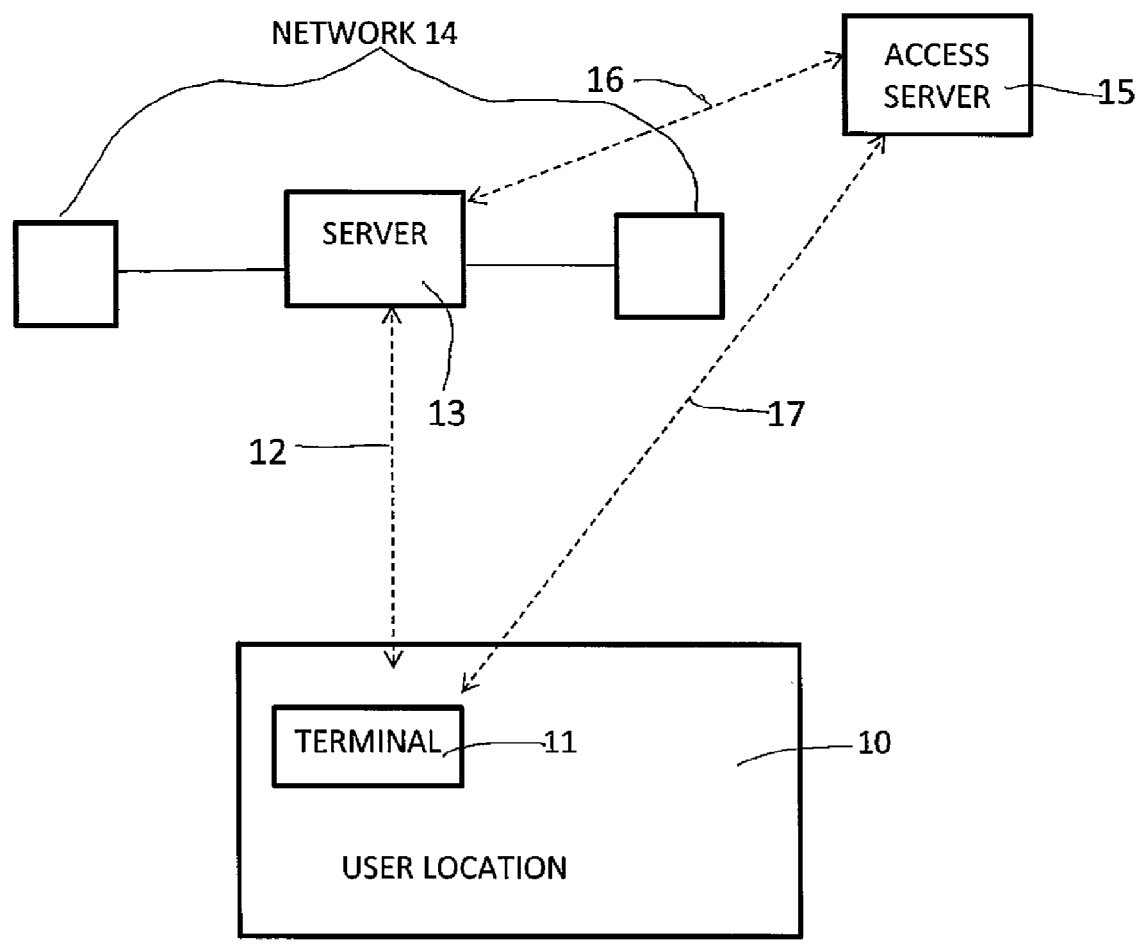
FIG. 1 is a schematic illustration of a first embodiment of the invention using a cloud-based access server.

In FIG. 1 is disclosed a first embodiment where a user is located at a user location 10 including a computer access terminal 11. The user location communicates through a communication path 12 to a server 13 which forms part of a network 14. As part of the system is also provided an access server 15 which communicates with the server 13 through a second path 16. Communication is also enabled between the access server 15 and the terminal 11 through a third path 17. Typically in many cases the communication paths 12, 16 and 17 are provided using Internet communication protocols. However other routes may be selected for one or more of those paths.

Figure 2:
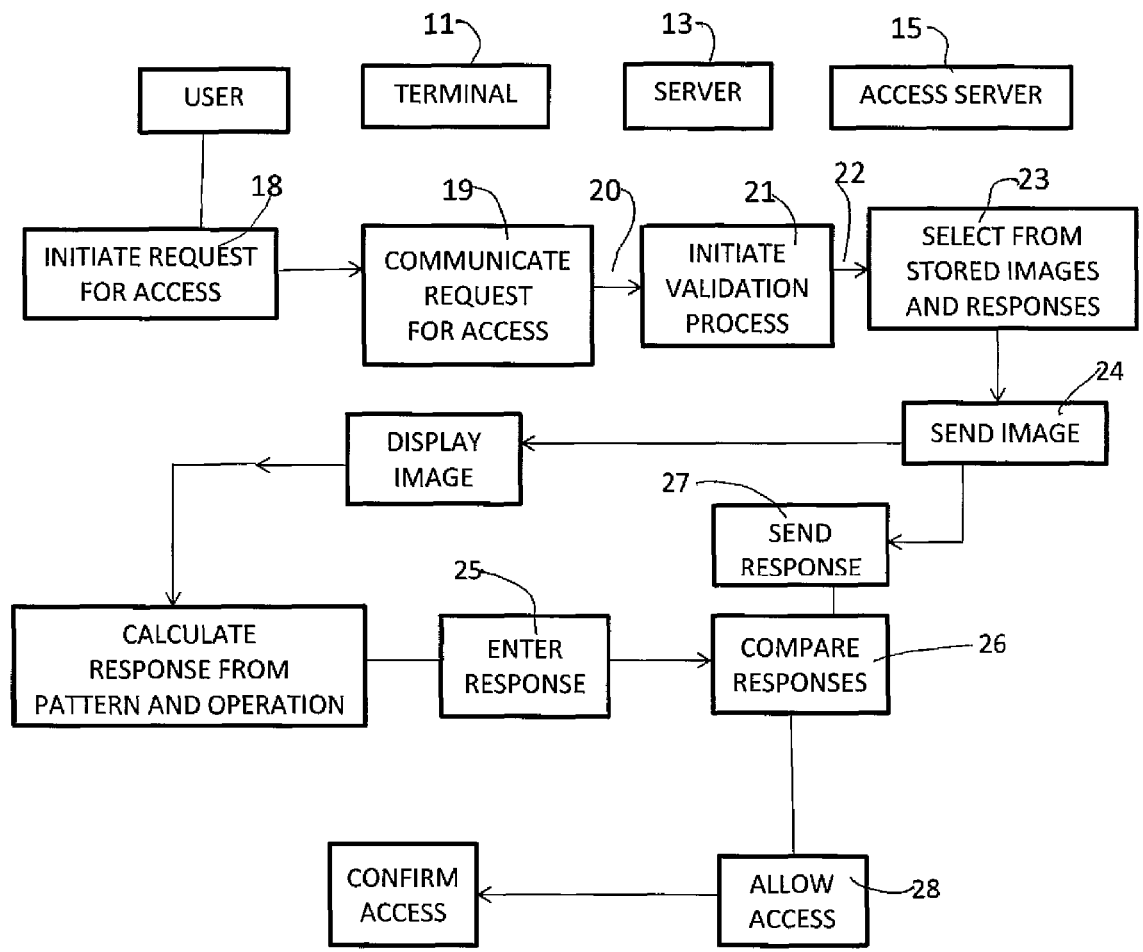
FIG. 2 is a flowchart of operations using the embodiment of FIG. 1.

Turning now to FIG. 2 there is shown a flowchart of communications and actions taken by the user, terminal 11, server 13 and access server 15. Thus in a first step 18 the user initiates a request for access which is activated at step 19 on the terminal 11 which communicates to the server 13 as indicated at 20 to initiate the validation process as indicated at 21.

In response to the initiation of the validation process, the server 13 communicates with the server 15 as indicated at 22 where the server 15 selects at 23 from a set of previously stored images and responses associated with the user. That is the user has previously set up a pattern recognition identification together with an operation to be carried out on the symbols selected by the pattern recognition. The access server from the pattern recognition and operation steps calculates and stores a series of images and responses calculated from those images. The symbols to be used in the pattern recognition and operation are not stored as a series of characters but instead are stored directly as an image file independent of the characters within the image. At no point in the process therefore is there any communication of a string of characters, but instead all calculations carried out by the user are carried out based upon the image displayed.

From the set of images and responses previously stored, the access server 15 selects by any suitable selection system such as random selection a particular image and response to be used in the present transaction. From that image and response the access server transmits at step 24 to the terminal 11 using the communication path 17 the image to be displayed. That image is then displayed on the terminal to the user. The user can then calculate from that image using the pattern recognition the particular characters to be used and can then carry out the operation on those characters to calculate the response. The response is then entered into the terminal at step 25 to the server 13 a comparison is made at step 26 between the response sent to the server 13 at step 27 by the server 15 and the response received from the user in step 25. In the event that the recipient response is identical to the response previously stored, the server 13 is programmed to allow access by the terminal 11 to the server for future communications.

Figure 3:
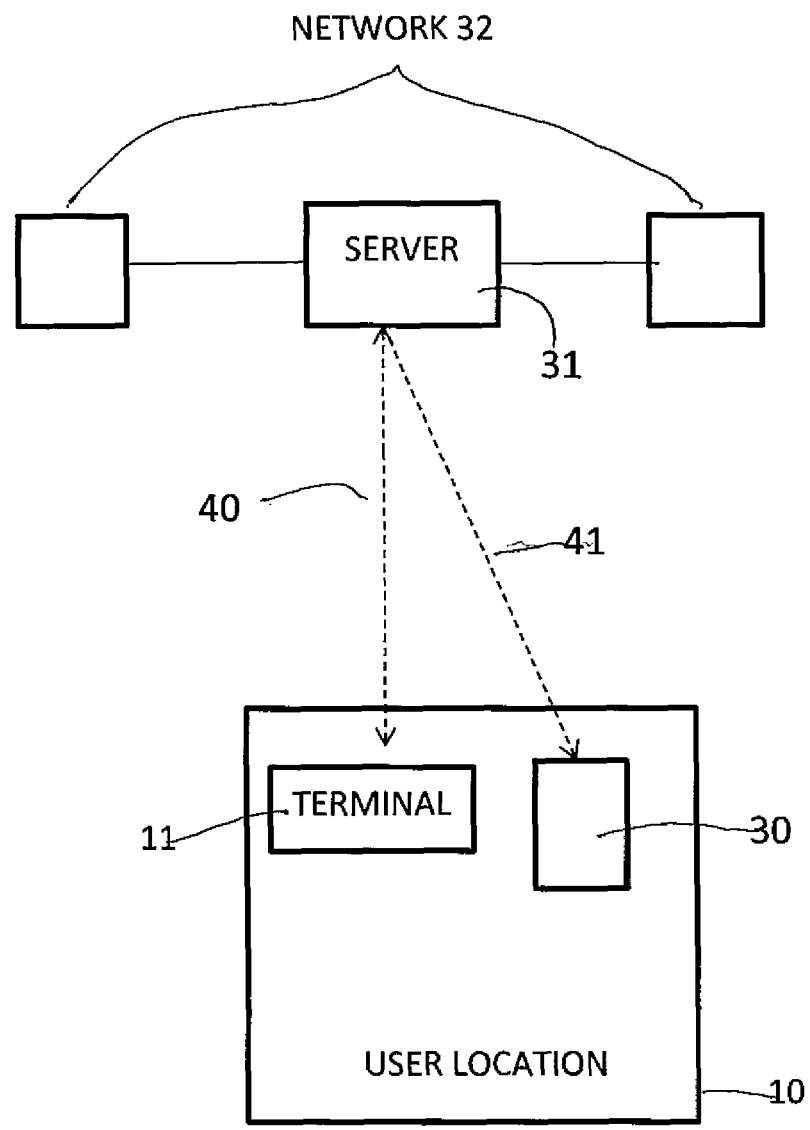
FIG. 3 is a schematic illustration of a second embodiment of the invention using a single server but communicating to the user location using a separate mobile device.
Figure 4:
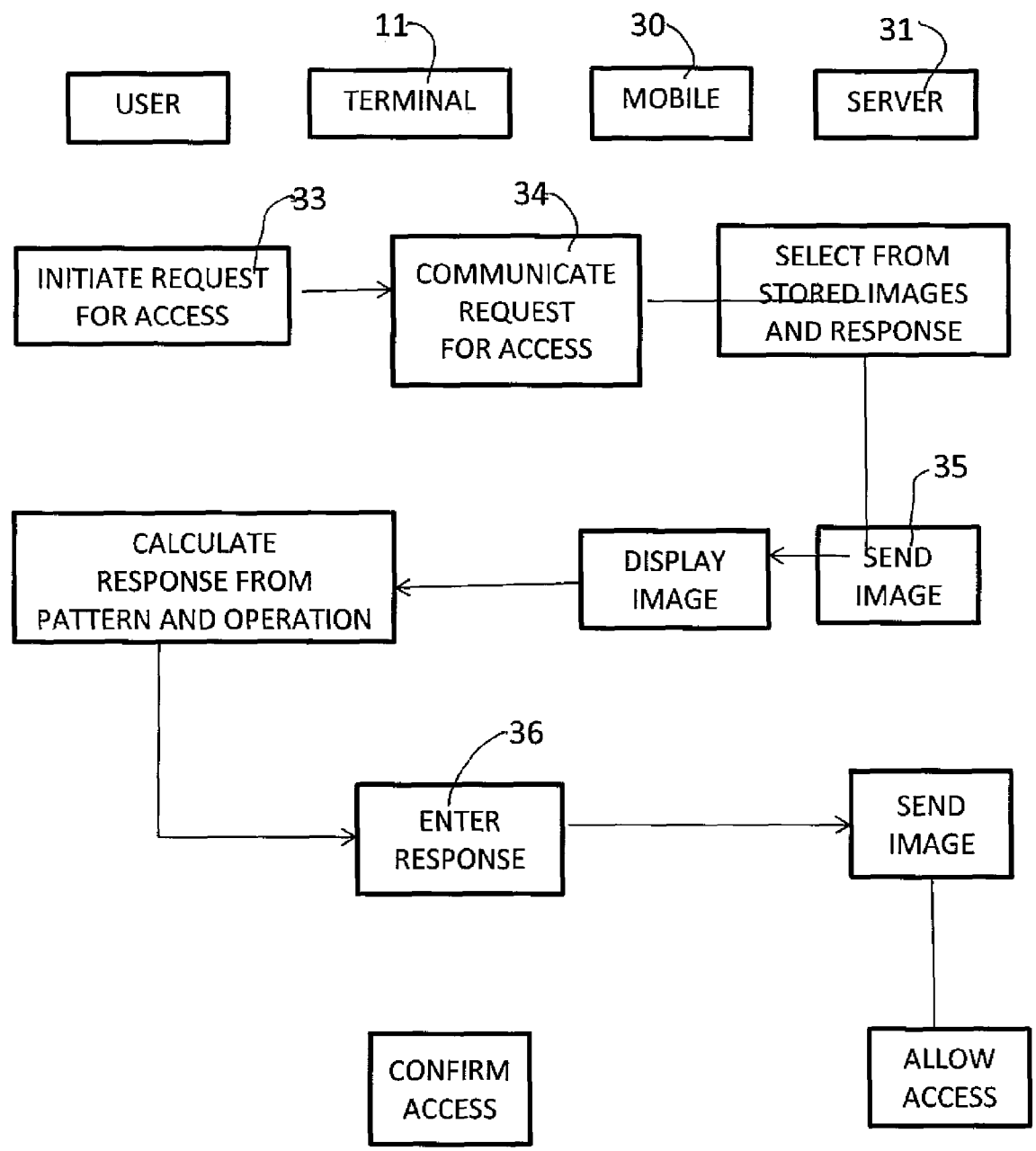
FIG. 4 is a flowchart of operations using the embodiment of FIG. 3.

In FIG. 3 is shown a second embodiment where at the user location 10 is provided the terminal 11 together with a separate mobile device 30. In this embodiment a server 31 forming part of a network 32 carries out the functions previously described. Thus as shown in figure where the operations of the terminal 11 and the server 31 are shown together with the operations of the mobile device 30. Similarly to the previous embodiment initiates at step 33 which is communicated by the terminal at step 34 to the server 31. In this embodiment the server 31 carries out the functions of the access server in that it selects from the stored images and responses previously calculated a particular image and response with the image selected being sent at step 35 to the mobile 30 where the image is displayed. It will be noted in FIG. 3 that the communication path 40 from the terminal to the server is different from the communication path 41 from the server to the mobile. Typically the paths 40 and 41 will be through the Internet using https protocols.

As set out previously, the user carries out the calculation of the response from the pattern recognition and operation processes and the response is from the terminal to the server where the comparison is carried out to allow access in the event of a match between the calculated response and the previously determined response.

Figure 5:
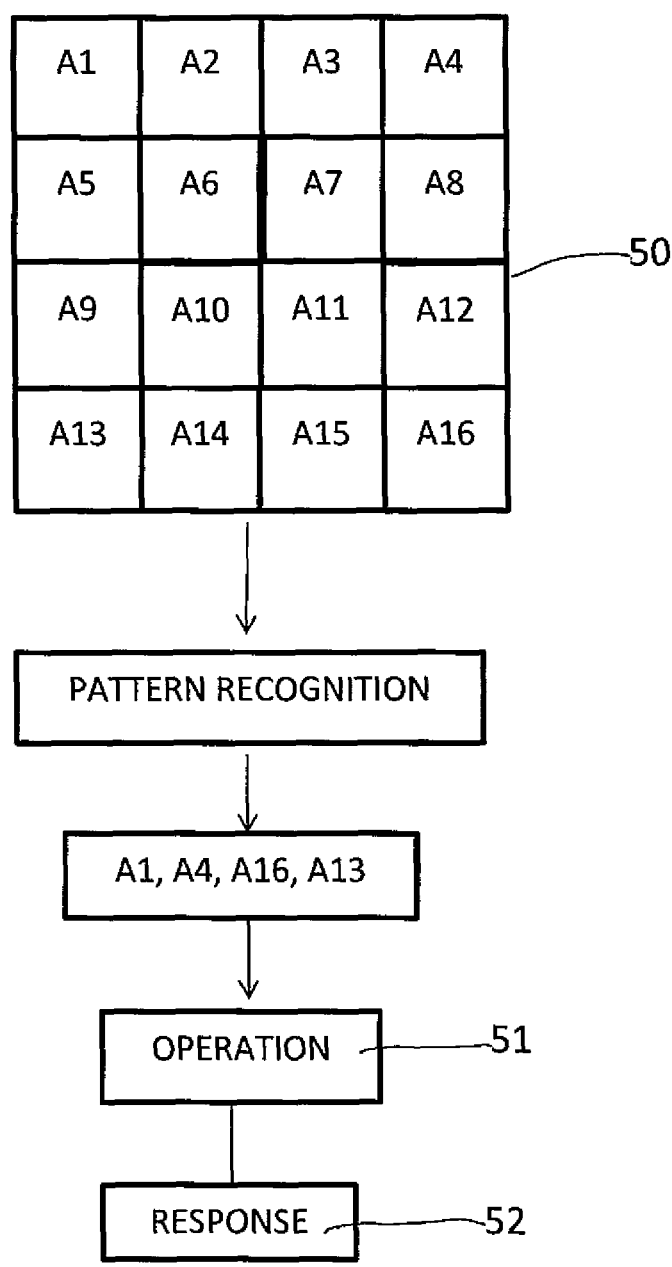
FIG. 5 is a schematic illustration of the steps involved in recognition and operation process required for computation of the response.

As shown in FIG. 5 there is 50 which contains a matrix of symbols A1 to A16. As set out previously the symbols can be numbers, letters or other characters as determined by the system. Typically numbers are used as these are most easily recognised and used in a further operation. The user on observing the image can determine the selected symbols using the predetermined pattern recognition system. In the example shown the pattern recognition relates to the four corners of the matrix so that the four symbols at those corners are selected and held in mind for a suitable operation to be carried out. The operation indicated at 51 may be a simple mathematical exercise such as to sum all of the four symbols. As indicated at 52 the user determines the response from the known pattern and known operation for communication by the terminal to the access system.

The invention claimed is:

1. A method for approving access from a user location having a computer terminal of a user to a computer network or web resource on a server system comprising:
    initiating an access request for an access session by the computer terminal of the user location on a communications link between the server system and the computer terminal;
    in response to the access request, sending to the user location a clue table image containing on the image a pattern of characters, the image for the access session being different from images generated for previous sessions;
    displaying said image including the pattern of characters to said user;
    to commence a session, causing said user to compute from the image a response;

causing said user to enter the response into the computer terminal for communication to the server system;

comparing said response received with an expected response computed from said image;

and selectively providing access by the user to said server system on said communication link for said session in conformity with a matching result of said comparing;

and sending an access approval/denial for the server system or web resource to the computer terminal;

wherein the image is communicated to the user location from a server separate from said server system so that the communication of the image is effected on a communications link different from the communication link between the terminal and said servers system and wherein the different communications link uses https:/ internet protocol;

and wherein the response is computed by firstly selecting a selected set of the characters in the image by determining the location in the image of the characters based on a predetermined pattern of the characters in the image and secondly by carrying out an operation on the selected set.

2. The method according to claim 1 wherein the image is communicated by the separate server on receipt of a request from the server system.

3. The method according to claim 2 wherein the separate server is cloud based.

4. The method according to claim 1 wherein the image is communicated to the user location from the server system to a mobile device at the user location separate from said computer terminal.

5. The method according to claim 1 wherein the image is not stored at the computer terminal.

6. The method according to claim 1 wherein the server system comprises a device operating system or web resource.

7. The method according to claim 1 wherein the device operating system allows the user to go anywhere in network provided by the server system.

8. The method according to claim 1 wherein the user is required to download an app that is specific to their type of computer terminal in order to use the system.

9. The method according to claim 1 wherein the computer terminal comprises a mobile device.

10. The method according to claim 1 wherein the characters in the image are numerical values.

11. The method according to claim 1 wherein the operation is the characters.

12. The method according to claim 1 wherein during computing of the response said user performs at least one operation on said character of said at least one of said elements of said predetermined selected set such that the response comprises at least one hidden character which is not identical to any one of said characters upon which the operation is performed.

* * * * *